US010160263B2

(12) United States Patent
Lee et al.

(10) Patent No.: US 10,160,263 B2
(45) Date of Patent: Dec. 25, 2018

(54) TIRE WITH NON-SPLICED MULTILAYERED FILM INNERLINER

(71) Applicant: The Goodyear Tire & Rubber Company, Akron, OH (US)

(72) Inventors: Byoung Jo Lee, Copley, OH (US); Philip Alan Dunker, Stow, OH (US); John Fleming Brainerd, II, Wadsworth, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 411 days.

(21) Appl. No.: 14/992,048

(22) Filed: Jan. 11, 2016

(65) Prior Publication Data

US 2017/0197464 A1 Jul. 13, 2017

(51) Int. Cl.

| | |
|---|---|
| *B60C 5/14* | (2006.01) |
| *B60B 1/00* | (2006.01) |
| *B60C 1/00* | (2006.01) |
| *B60C 9/02* | (2006.01) |
| *B32B 27/34* | (2006.01) |
| *B32B 27/28* | (2006.01) |
| *B32B 27/08* | (2006.01) |
| *C08J 5/18* | (2006.01) |
| *B32B 7/02* | (2006.01) |
| *B29D 30/06* | (2006.01) |
| *B32B 7/12* | (2006.01) |
| *B32B 25/04* | (2006.01) |
| *B32B 25/08* | (2006.01) |
| *B32B 25/14* | (2006.01) |
| *B32B 25/16* | (2006.01) |
| *B32B 1/08* | (2006.01) |
| *C08G 81/00* | (2006.01) |
| *C08J 7/04* | (2006.01) |
| *C08L 71/00* | (2006.01) |
| *C08L 71/02* | (2006.01) |
| *C08L 77/00* | (2006.01) |
| *C09J 7/20* | (2018.01) |
| *C09J 7/35* | (2018.01) |
| *C09J 7/22* | (2018.01) |

(52) U.S. Cl.
CPC ........ *B60C 1/0008* (2013.01); *B29D 30/0681* (2013.01); *B32B 1/08* (2013.01); *B32B 7/02* (2013.01); *B32B 7/12* (2013.01); *B32B 25/042* (2013.01); *B32B 25/08* (2013.01); *B32B 25/14* (2013.01); *B32B 25/16* (2013.01); *B32B 27/08* (2013.01); *B32B 27/285* (2013.01); *B32B 27/34* (2013.01); *B60C 1/0041* (2013.01); *B60C 5/14* (2013.01); *B60C 9/02* (2013.01); *C08G 81/00* (2013.01); *C08J 5/18* (2013.01); *C08J 7/047* (2013.01); *C08L 71/00* (2013.01); *C08L 71/02* (2013.01); *C08L 77/00* (2013.01); *C09J 7/20* (2018.01); *C09J 7/22* (2018.01); *C09J 7/35* (2018.01); *B29D 2030/0682* (2013.01); *B32B 2250/03* (2013.01); *B32B 2250/04* (2013.01); *B32B 2250/05* (2013.01); *B32B 2250/24* (2013.01); *B32B 2250/42* (2013.01); *B32B 2255/10* (2013.01); *B32B 2255/26* (2013.01); *B32B 2270/00* (2013.01); *B32B 2274/00* (2013.01); *B32B 2307/54* (2013.01); *B32B 2307/7242* (2013.01); *B32B 2605/00* (2013.01); *B60C 2005/145* (2013.01); *C08J 2377/00* (2013.01); *C08J 2377/02* (2013.01); *C08J 2377/06* (2013.01); *C08J 2461/12* (2013.01); *C08J 2477/00* (2013.01); *C08L 2205/05* (2013.01); *C09J 2201/622* (2013.01); *C09J 2461/00* (2013.01); *C09J 2471/006* (2013.01); *C09J 2477/006* (2013.01)

(58) Field of Classification Search
CPC .. B60C 5/00; B60C 5/14; B60C 5/142; B60C 1/00; B60C 1/0008
See application file for complete search history.

(56) References Cited

U.S. PATENT DOCUMENTS

| | | |
|---|---|---|
| 4,928,741 A | 5/1990 | Rye |
| 5,040,583 A | 8/1991 | Lin |
| 5,938,869 A | 8/1999 | Kaido |
| 6,359,071 B1 | 3/2002 | Watanabe et al. |
| 6,376,598 B1 | 4/2002 | Wang |
| 6,843,292 B2 | 1/2005 | Wang |
| 6,861,470 B2 | 3/2005 | Watanabe |
| 8,544,517 B2 | 10/2013 | Hong et al. |
| 2001/0041762 A1 | 11/2001 | Ikawa et al. |
| 2012/0279626 A1* | 11/2012 | Incavo ............... B60C 1/0008 152/510 |
| 2013/0101821 A1 | 4/2013 | Jeon et al. |
| 2013/0192736 A1 | 8/2013 | Song et al. |
| 2013/0199686 A1 | 8/2013 | Chung et al. |
| 2014/0227499 A1 | 8/2014 | Kwon et al. |
| 2014/0242370 A1 | 8/2014 | Song et al. |

FOREIGN PATENT DOCUMENTS

| | | |
|---|---|---|
| EP | 0706878 A2 | 4/1996 |
| EP | 0722850 A1 | 7/1996 |
| EP | 1726620 A1 | 11/2006 |
| EP | 1880871 A1 | 1/2008 |
| EP | 2839972 A1 | 2/2015 |
| WO | 2007050061 A1 | 5/2007 |
| WO | 2007050236 A1 | 5/2007 |
| WO | 2007070728 A2 | 6/2007 |
| WO | 2007111584 | 10/2007 |
| WO | 2008051253 | 5/2008 |

OTHER PUBLICATIONS

EPO Search Report received by Applicant dated Jun. 26, 2017.

\* cited by examiner

*Primary Examiner* — Justin R Fischer
(74) *Attorney, Agent, or Firm* — Henry C. Young, Jr.

(57) ABSTRACT

The present invention relates to a pneumatic tire having a non-spliced film innerliner comprised of a plurality of film layers where said film layers are of varied film moduli physical properties.

11 Claims, No Drawings

TIRE WITH NON-SPLICED MULTILAYERED FILM INNERLINER

FIELD OF THE INVENTION

The present invention relates to a pneumatic tire having a non-spliced film innerliner comprised of a plurality of film layers where said film layers are of varied film moduli physical properties.

BACKGROUND OF THE INVENTION

Pneumatic tires usually contain innerliner layers to retard permeation of air from the tire's cavity into the tire carcass. Such innerliner, or barrier, layers are usually in a form of layers comprised of butyl rubber or halogenated butyl rubber (sometimes referred to as halobutyl rubber) based rubber compositions which provide resistance to permeability of air.

To adequately promote resistance to air permeability, such innerliner is typically provided as a sufficiently thick layer which, in turn, may add significant weight to the tire.

Accordingly, various alternative thin air permeability resistant films have been proposed for pneumatic tire innerliners which are significantly lighter in weight. For example, and not intended to be limiting, see U.S. Pat. Nos. 4,928,741, 5,040,583, 5,938,869, 6,359,071, 6,376,598, 6,843,292, 6,861,470 and 8,544,517; U.S. Patent Publication Nos. 2001/0041762, 2013/0101821, 2013/0192736, 2013/0199686, 2014/0227499 and 2014/0242370; PCT Patent Publication Nos. WO/2007/050061, WO/2007/050236, WO/2007/070728, WO/2007/111584, WO/2008/051253, and European Patent Publication Nos. EP 0706878, EP 0722850, EP 1726620 and EP 1880871.

Various thin films of various polymers have been proposed for a tire innerliner layer comprised of, for example, a combination of thermoplastic resin which may contain a blend or dispersion of various polymers or copolymers. The such films may be provided, for example, with a coating on both of its sides with an RFL (resorcinol/formaldehyde latex based) adhesive to promote adhering of overlapping ends of the film together, particularly where the film is placed on the circumferential inner surface of the tire.

For this invention, it is desired to provide a pneumatic tire having an innerliner to promote a combination of adaption to the tire's rubber carcass and to promote resistance to air permeation.

For such challenge, such innerliner is proposed as a non-spliced, multilayered continuous laminate of a plurality of film layers with varied individual film layer moduli which extends in a circumferential direction to cover the inner surface of the of the tire's rubber carcass (the surface of the pneumatic tire's carcass facing its air chamber with the innerliner therebetween). Such proposed innerliner is a laminate of films with individually or collectively graduated, alternating, random, or their combination of individual film layer moduli of the innerliner multi-layered laminate film.

In one embodiment, the innermost film layer of said innerliner laminate (facing the tire carcass) contains a thin RFL coating on its surface adjacent to the tire rubber carcass (to promote adherence of the film laminate to the tire rubber carcass).

In one embodiment, the innermost film layer of said innerliner laminate has a film modulus lower than the film modulus of the film laminate to promote physical compatibility of the film laminate with the surface of tire rubber carcass (through the RFL coating).

In one embodiment, for such challenge, it is proposed to provide such innerliner laminate with its multiple film layers having directionally increasing film layer moduli, alternate film layer moduli, random film layer moduli and their combination with the innermost film of the laminate (facing the tire rubber carcass through the aforesaid RFL coating) having a film modulus lower than the film modulus of the film laminate.

In one embodiment, the innerliner film laminate is comprised of at least 2, alternately at least 4, of the film layers. In one embodiment, the innerliner film laminate is comprised of a range of from 2 through about 30, alternately from 4 through about 15, of the film layers.

The laminate may be provided, for example, as an extrusion of a laminate comprised of the said film layers and thereby a film layered laminate extrusion, such as, for example, by blow molding to form a tubular shaped laminate of a desired diameter which may then be cut into individual seamless (non-spliced) hoops of the laminate.

The film layers of the laminate are comprised of a thermoplastic polyamide-based polymer which contains dispersed polymer domains therein where said dispersed domains are composed of a blend of copolymer comprised of a polyamide based segment and a polyoxyalkylene diamine.

The modulus of the laminate (which might be referred to herein as a film modulus) is presented by ASTM D882 Test at a 25 percent strain (23° C.) using a cross head speed of 300 mm/min and reported in terms of MPa (megapascals) stress under such conditions. For the test, the laminate is clamped (gripped) between two clamps spaced apart from each other by 30 mm and then stretched in the direction of its formative extrusion (in the laminate's direction of formation by extrusion from an extruder). The overall film modulus of the multilayered film laminate may be tested in this manner. The individual film layers of the multilayered film laminate might be individually formed and submitted to the film modulus test by, for example, individually extruding each film layer and testing each individually extruded film in this manner.

The outermost and innermost surfaces of the multilayered film laminate may be tested for their hardness where, in one embodiment it may be desired that the hardness of the innermost film layer (the laminate's film layer facing the tire's rubber carcass) is softer than the outermost film layer of the laminate. A suitable hardness test is an instrumented indentation test as ASTM Test E2546-7. A descriptive "Introduction to Instrumented Indentation Testing" by J. Hay may be found in *Experimental Techniques*, Pages 66 through 72, November/December 2009, *Society for Experimental Mechanics*. The indentation test reportedly may be used for testing thin films to measure hardness (H) and Young's modulus (E) as a relationship between stress and strain for small volumes of films when the film deformation is elastic.

The multilayered innerliner film may be prepared, for example, by co-extrusion of the polyamide-based polymer containing various levels of the dispersed domains to provide the physical moduli of the individual co-extruded film layers. For example, a higher level (an increased domain concentration) could be used to provide a decreased film modulus of an individual film of the film laminate.

In practice, as indicated, the multilayered innerliner film laminate may be blow molded and tubular film then sliced to form individual hoops of the multilayered film of desired diameters. The seamless hoop of the laminate may be positioned on a tire building drum and the tire built thereover.

A significant aspect of the invention is providing an innerliner multilayer film laminate, and tire with such multilayered film laminate innerliner, positioned continuously and circumferentially around the tire inner surface comprised of a plurality of film layers of cooperative varying moduli without a splice to disrupt the complex layered moduli rheology of the laminate and air permeability innerliner by an abutted or overlapped splice which would in turn provide the laminate with discontinuous and likely missmatched ends of multiple layers of the varied film layer moduli and thereby provide generally unwanted varied air permeability resistance across the width of the innerliner laminate at such splice.

SUMMARY AND PRACTICE OF THE INVENTION

In accordance with this invention, a pneumatic tire is provided having a continuous, non-spliced, innerliner comprised of a multilayered innerliner film laminate circumferentially covering at least a portion of the tire carcass's inner surface (said innerliner laminate therefor extends around the entire circumference of the tire's inner surface facing the tire's inner air chamber);

wherein innermost film layer of said multilayered innerliner film laminate contains an RFL adhesive coating on its innermost surface facing the tire carcass desirably having a thickness of less than 2 microns (the thin RFL coating is therefore positioned between the innerliner film laminate and tire carcass rubber surface);

wherein said multilayered innerliner film laminate is comprised of at least 2, alternately at least 4, film layers, and alternately comprised of a range of from 2 to about 30, alternately a range of form 2 to about 15, film layers;

wherein the multilayered innerliner film laminate has a film modulus in a range of from about 8 to about 20, alternately from about 12 to about 18, MPa;

wherein said innerliner is a laminate comprised of said plurality of film layers where the innermost film layer (the film layer facing the tire rubber carcass with the said RFL adhesive therebetween) has a film modulus lower than the film modulus of the film laminate, for example, and for one embodiment, in a range of from about 5 to about 11 MPa and, for example and for one embodiment, at least about 1 MPa lower than the film modulus of the film laminate), and wherein:

(A) said film layers have directionally increasing film moduli of at least about 0.5 MPa for each adjoining film of said laminate extending (axially extending, namely extending in a axial direction) from the innermost film layer through the outermost film layer of said film laminate, or (B) said film layers have alternating film moduli of at least about 0.5 MPa for each adjoining film of said film laminate, or (C) said film layers have randomly distributed film moduli of at least about 0.5 MPa for each adjoining film of said film laminate, or (D) said film layers comprised of a combination of said directional increasing, alternating or randomly distributed film moduli of said film moduli, or (E) said film layers having any of said directionally increasing, alternating, randomly distributed or combination of film moduli of said film laminate wherein at least 2, alternately from 2 to 4, of said adjoining films of said film laminate have a film modulus differing by less than about 0.3 MPa, alternately less than about 0.2 MPa, wherein the layers of said innerliner film are comprised of:

(1) from about 40 to about 85 weight percent of a thermoplastic polyamide-based polymer (resin), which may be comprised of, for example, a copolymer of a diamine and dicarboxylic acid, and (2) a range of from about 15 to about 60 weight percent of a dispersion contained in said thermoplastic polyamide-based polymer comprised of at least one of:

(a) copolymer or mixture comprised of a polyamide-based segment and a polyether-based segment, and (b) polymer comprised of at least one of polyalkylene glycol (e.g. at least one of polyethyleneglycol, polypropyleneglycol and polytetramethylene glycol), polyoxyalkylene diamine (e.g. at least one of polyoxyethylene diamine, polyoxypropylene diamine and polyoxytetramethylene diamine) and copolymers thereof.

In one embodiment, the innermost film of said laminate has a film modulus lower than the film modulus of the laminate (to promote adaptability of the laminate to the tire rubber carcass, particularly to promote physical compatibility of the innerliner film with the surface of the tire rubber carcass through the thin RFL adhesive coating).

In one embodiment, the outer surface of the innermost film layer (the surface facing the tire carcass) of said multilayer film laminate contains a thin RFL adhesive coating having a thickness of less than 2 microns. A purpose of the RFL coating on the surface of the innermost film layer is to promote adhesion (e.g. building tack) of the film laminate to the uncured tire carcass rubber and also to promote adhesion of the film laminate to the cured tire carcass rubber upon curing of the rubber tire carcass. The average thickness of the RFL coating of less than 2 microns is to rely upon the innerliner laminate to promote air permeability resistance with minimal interference of the RFL coating.

In one embodiment, the said dispersion is in a form of domains thereof dispersed in said thermoplastic polymer.

In practice, an increase in concentration of said dispersion in said film layer is provided sufficient to provide an appropriate increase, or decrease, in its film modulus. For example, said dispersion (content or concentration of the dispersion) in a film layer may be decreased to promote an increase in its film modulus as well as an envisioned increase in its air permeability resistance.

In practice, as indicated, it is desired that the innermost layer of said innerliner film laminate facing the tire rubber tire carcass, through the RFL coating on said film, has a lower film modulus than the laminate such as, for example, a film modulus in a range of form about 5 to about 11 MPa so long as it is lower than the film modulus of the laminate. (For example, its film modulus is desirably at least one MPa lower than the film modulus of the film laminate excluding, of course, the aforesaid RFL coating on the innermost surface of the film laminate.)

In practice, the innermost surface of the innerliner film containing the RFL adhesive coating to provide building tack between the innerliner film and uncured tire rubber carcass and to be thereby cohesively adhered, or bonded, by the RFL adhesive to the tire rubber carcass. Such tire rubber carcass is generally comprised of a sulfur curable diene-based elastomer comprised of at least one polymer of at least one of isoprene and of 1,3-butadiene and of styrene with at least one of isoprene and 1,3-butadiene, wherein said elastomer is desirably exclusive of a copolymer of isobutylene and diene hydrocarbon.

As indicated, the layers of the multilayered innerliner film laminate are comprised of a copolymer of diamine and dicarboxylic acid representative of which are at least one of nylon 6, nylon 6-6, nylon 4,6, nylon 11, nylon 12, nylon 6,10 and nylon 6,12, wherein at least one of nylon 6 and nylon 6-6 may be most desirable.

A representative of tire innerliner films, in general and not intended to be limitative, may be found, for example, in U.S. Pat. No. 8,544,517 and U.S. Patent Publication Nos. 2013/0101821, 2013/0199686 and 2014/0227499 which are referenced and included herein in their entirety.

Nylon is a generic designation for a family of synthetic thermoplastic polymers generally known as aliphatic polyamides as copolymers of a diamine and dicarboxylic acid. They are, generally, polymers composed of repeating units linked by amide bonds which are frequently referred to as being polyamides. Nylons are condensation polymers formed by reacting relatively equal parts of a diamine with a dicarboxylic acid. Amides are usually formed at both ends of each monomer. Chemical elements of the nylons include carbon, hydrogen, nitrogen and oxygen. For example, nylon 6 is reported as being a polycaprolactam having a melting point of about 220° C. Nylon 6-6 is reported as being a polymer of hexamethylenediamine (a 6 carbon diamine) and adipic acid (e.g. polyhexamethylene adipamide) having a melting point of about 265° C. Nylon 6,12 is reported as being a copolymer of a 6 carbon diamine and 12 carbon dicarboxylic acid.

In one embodiment, and as previously indicated, only one side of the innermost film layer of the multilayered innerliner film laminate contains an RFL adhesive coating to promote bonding of the innerliner film to the adjoining carcass ply. Such RFL coating is typically comprised of a resorcinol-formaldehyde resin/styrene-butadiene-vinylpyridine latex optionally containing a styrene-butadiene rubber latex, and optionally containing a blocked isocyanate.

In further accordance with this invention, said tire assembly is provided as a sulfur vulcanized composite and thereby a cured rubber tire. Such vulcanization may be conducted, for example, under conditions of elevated temperature and pressure as would be well known to those having skill in such art of rubber vulcanization.

Representative of sulfur vulcanizable elastomers of said tire carcass to which said RFL adhesive is in contact may be comprised of, for example, cis 1,4-polyisoprene, cis 1,4-polybutdiene and styrene/butadiene copolymer rubbers.

In additional accordance with the invention, the tire is further provided as a cured tire having been cured in a suitable mold at an elevated temperature.

As indicated, the thin polymeric innerliner film laminate of the plurality film layers may have a thickness, for example, of from about 25 to about 200 microns. Alternately the thickness of the thin film laminate may range from about 50 microns to about 150 microns where the individual film layers may have varying individual film thicknesses as may be desired, for example, an individual film thickness of at least about 2 microns.

The aforesaid thin innerliner film laminate for the barrier layer may have an oxygen permeability, for example, of less than $20 \times 10^{-12}$ cc-cm/cm$^2$·sec·cmHg. Desirably, the aforesaid polymeric innerliner film laminate may have an elongation, for example, of at least about 200 percent at about 23° C. As such, it is intended that, when used as the innerliner layer of the tire, the polymeric film is not intended to break during the tire shaping process.

The rubber compositions for the rubber tire carcass layer (ply) can contain conventional rubber tire additives to provide a desired rubber property as would be applied by one having skill in the appropriate art. Such known and commonly used additive materials may include, for example, sulfur cure activators, retarders and accelerators, rubber processing oils, resins including tackifying resins, plasticizers, fatty acids, zinc oxide, waxes, antidegradant, antiozonants and peptizing agents.

The uncured tire assembly can be molded and sulfur cured in a suitable tire mold at an elevated temperature and pressure conditions as would be appreciated and known to those having skill in such art.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicants' general inventive concept.

What is claimed is:

1. A pneumatic tire is provided having a continuous, non-spliced, innerliner comprised of a multilayered innerliner film laminate circumferentially covering at least a portion of the tire carcass's inner surface;
    wherein the innermost film layer of said multilayered innerliner film laminate contains an RFL adhesive coating on its surface facing to the tire carcass to thereby provide said RFL coating between said innerliner film laminate and tire carcass,
    wherein said multilayered innerliner film laminate is comprised of at least 2 film layers;
    wherein the modulus of the multilayered innerliner film laminate is in a range of from about 8 to about 20 MPa;
    wherein said innerliner laminate is comprised of a laminate of plurality of film layers, where the innermost film layer has a film modulus less than the film modulus of the film laminate, and wherein:
    (A) said film layers have directionally increasing film moduli of at least about 0.5 MPa for each adjoining film of said laminate extending from the innermost film layer through the outermost film layer of said film laminate, or
    (B) said film layers have alternating film moduli of at least about 0.5 MPa for each adjoining film of said film laminate, or
    (C) said film layers have randomly distributed film moduli of at least about 0.5 MPa for each adjoining film of said film laminate, or
    (D) said film layers comprised of a combination of said directional increasing, alternating or randomly distributed film moduli of said film moduli, or
    (E) said film layers having any of said directionally increasing, alternating, randomly distributed or combination of film moduli of said film laminate of at least about 0.5 MPa for each adjoining film of said film laminate, provided however that at least 2 of said adjoining films of said film laminate have a film modulus differing by less than about 0.3 MPa, wherein the layers of said innerliner film laminate are comprised of:
(1) from about 40 to about 85 weight percent of a thermoplastic polyamide-based polymer comprised of a copolymer of a diamine and dicarboxylic acid, and
(2) a range of from about 15 to about 60 weight percent of a dispersion contained in said thermoplastic polyamide-based polymer comprised of at least one of:
  (a) copolymer or mixture comprised of a polyamide-based segment and a polyether-based segment, and
  (b) polymer comprised of at least one of polyalkylene glycol (e.g. at least one of polyethyleneglycol, polypropyleneglycol and polytetramethylene glycol), polyoxyalkylene diamine (e.g. at least one of polyoxyethylene diamine, polyoxypropylene diamine and polyoxytetramethylene diamine) and copolymers thereof.

2. The tire of claim 1 wherein the said dispersion contained in the thermoplastic polymer is in a form of domains thereof dispersed in said thermoplastic polyamide-based polymer.

3. The tire of claim 1 wherein the innermost film layer of said innerliner film laminate facing the tire rubber tire carcass through the RFL coating on said film has a film modulus in a range of from about 5 to about 11 MPa.

4. The tire of claim 1 wherein the innermost film layer of said innerliner film laminate has a film modulus of at least about 1 MPa less than the modulus of the innerliner film laminate.

5. The tire of claim 3 wherein the innermost film layer of said innerliner film laminate has a film modulus of at least about 1 MPa less than the modulus of the innerliner film laminate.

6. The tire of claim 1 wherein the film layers said film laminate have an individual thickness of at least about 2 microns.

7. The tire of claim 1 wherein the thickness of said RFL coating is less than 2microns.

8. The tire of claim 1 wherein tire rubber carcass is comprised of a sulfur curable diene-based elastomer comprised of at least one polymer of at least one of isoprene and of 1,3-butadiene and of styrene with at least one of isoprene and 1,3-butadiene, exclusive of a copolymer of isobutylene and diene hydrocarbon.

9. The tire of claim 1 wherein the thermoplastic diamine-based polymer of the innerliner film is a copolymer of diamine and dicarboxylic acid comprised of at least one of nylon 6, nylon 6-6, nylon 4,6, nylon 11, nylon 12, nylon 6,10 and nylon 6,12.

10. The tire of claim 1 wherein the thermoplastic diamine-based polymer of the innerliner film is comprised of at least one of polycaprolactam (nylon 6) and copolymer of hexamethylenediamine and adipic acid (nylon 6-6) where said thermoplastic polymer of said innerliner film contains a dispersion of a copolymer comprised of a polyamide segment and a polyether-based segment.

11. The tire of claim 1 wherein said RFL adhesive is comprised of a resorcinol-formaldehyde resin/styrene-butadiene-vinylpyridine latex optionally containing a styrene-butadiene rubber latex, and optionally containing a blocked isocyanate.

* * * * *